(12) United States Patent
Radlbeck et al.

(10) Patent No.: US 12,518,538 B2
(45) Date of Patent: Jan. 6, 2026

(54) PREDICTIVE AIRCRAFT CREW GALLEY SERVICE SYSTEM AND METHOD

(71) Applicant: B/E AEROSPACE, INC., Winston Salem, NC (US)

(72) Inventors: Andrew Radlbeck, South Glastonbury, CT (US); Raymond Hough, Great Denham (GB); Amit Surana, Newington, CT (US); Brian E. St. Rock, Andover, CT (US); Adwait Arun Trikanad, Hillsboro, OR (US); Caleb Harder, Vernon, CT (US); Pankaj Kalore, Lincolnshire, IL (US); Noah Avram Meltz Weichselbaum, Prairie Village, KS (US)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 18/672,439

(22) Filed: May 23, 2024

(65) Prior Publication Data

US 2025/0363804 A1   Nov. 27, 2025

(51) Int. Cl.
| | | |
|---|---|---|
| *G06V 20/52* | (2022.01) |
| *B64D 11/04* | (2006.01) |
| *B64D 47/08* | (2006.01) |
| *G06V 10/143* | (2022.01) |
| *G06V 10/36* | (2022.01) |
| *G06V 10/44* | (2022.01) |
| *G06V 10/80* | (2022.01) |
| *G06V 20/40* | (2022.01) |

(Continued)

(52) U.S. Cl.
CPC ............. *G06V 20/52* (2022.01); *B64D 11/04* (2013.01); *B64D 47/08* (2013.01); *G06V 10/143* (2022.01); *G06V 10/36* (2022.01); *G06V 10/44* (2022.01); *G06V 10/806* (2022.01); *G06V 20/46* (2022.01); *G06V 20/59* (2022.01); *H04N 23/11* (2023.01); *H04N 23/90* (2023.01)

(58) Field of Classification Search
CPC ........ G06V 20/52; G06V 10/36; G06V 10/44; G06V 10/806; G06V 20/46; B64D 47/08; B64D 11/04; H04N 23/11; H04N 23/90
See application file for complete search history.

(56) References Cited

U.S. PATENT DOCUMENTS

| 9,403,603 | B2 * | 8/2016 | Hozumi | ................. B64D 11/04 |
|---|---|---|---|---|
| 11,203,433 | B2 | 12/2021 | Dowty et al. | |

(Continued)

*Primary Examiner* — Boubacar Abdou Tchoussou
(74) *Attorney, Agent, or Firm* — SNELL & WILMER L.L.P.

(57) ABSTRACT

A predictive systems and methods for servicing an aircraft galley. The predictive aircraft galley service system may comprise a plurality of visible light cameras and a plurality of infrared cameras. The predictive aircraft galley service system may perform an inferred instantaneous state analysis based on machine learning and computer models processing data from the visible light and infrared camera. The predictive aircraft galley service system may provide notifications to aircraft crew regarding locations of objects in the aircraft galley and maintenance needs of the aircraft galley. The predictive aircraft galley service system may operate galley features automatically. The predictive aircraft galley service system may determine and store data about maintenance needs.

15 Claims, 9 Drawing Sheets

(51) Int. Cl.
    *G06V 20/59*     (2022.01)
    *H04N 23/11*     (2023.01)
    *H04N 23/90*     (2023.01)

(56) References Cited

U.S. PATENT DOCUMENTS

| | | | |
|---|---|---|---|
| 11,649,067 B2* | 5/2023 | Hunt | B64F 5/60 |
| | | | 382/103 |
| 11,897,634 B2* | 2/2024 | Radhakrishnan | G06T 7/0008 |
| 12,084,197 B2* | 9/2024 | Cabos | H04L 67/12 |
| 2015/0070492 A1* | 3/2015 | Hozumi | B64D 11/00 |
| | | | 348/143 |
| 2017/0113801 A1* | 4/2017 | Brunaux | B64D 11/00 |
| 2018/0302564 A1* | 10/2018 | Liu | H04N 13/246 |
| 2019/0177004 A1* | 6/2019 | Skelly | G06T 5/00 |
| 2020/0062402 A1 | 2/2020 | Godecker et al. | |
| 2022/0033108 A1* | 2/2022 | Radhakrishnan | G06T 7/0008 |
| 2022/0121838 A1* | 4/2022 | Goyal | G06T 7/20 |
| 2023/0337808 A1 | 10/2023 | Abreu Calfa et al. | |
| 2023/0370571 A1 | 11/2023 | Zachäus | |
| 2023/0399105 A1 | 12/2023 | Panjer et al. | |
| 2024/0025546 A1 | 1/2024 | Volkerink et al. | |
| 2024/0051677 A1* | 2/2024 | Goyal | B64D 45/00 |

* cited by examiner

PREDICTIVE AIRCRAFT CREW GALLEY SERVICE SYSTEM AND METHOD

FIELD

The present disclosure generally relates to aircraft galley service and, more particularly, to predictive systems and methods for servicing an aircraft galley.

BACKGROUND

Aircraft galleys may benefit from complex monitoring and maintenance. Streaming inferred state video data may automate monitoring and reporting of an aircraft galley state. Streaming multimodal video data may provide for predictive crew service triggers and efficient management of galley functions. Various multimodal sensors may collect visual or infrared video data of an aircraft galley.

SUMMARY

Disclosed herein is an aircraft galley service system. In various embodiments, the aircraft galley service system comprises a galley area comprising a plurality of galley features, a first visible light camera, a first infrared sensor, and a controller. In various embodiments, the controller receives first video data from the first visible light camera, receives first infrared data from the first infrared camera, identifies the galley feature based on at least one of the first video data and the first infrared data, identifies an instantaneous state of the galley area, and identifies an action in response to the instantaneous state.

In various embodiments, the plurality of galley features of the aircraft galley service system comprises at least one of a latch, a bin, an oven, a counter, a cart, or a chiller.

In various embodiments, the controller identifies a label of at least one of the plurality of galley features, identifies a storage space of the galley area, and conducts a fusion of at least two of the galley feature identification, the label identification, and the storage space identification.

In various embodiments, the aircraft galley service system comprises a second visible light camera, wherein the first visible light camera has a first field of view and the second visible light camera has a second field of view, and wherein the first field of view and the second field of view overlap.

In various embodiments, the controller identifies a common object detected by the first visible light camera and the second visible light camera, identifies a preferred field of view of the common object, and registers the preferred field of view.

In various embodiments, the controller conducts, in response to the instantaneous state, temporal filtering of the first video data and the second video data, and conducts, in response to the instantaneous state, persistent tracking of at least one of the galley features.

In various embodiments, the aircraft galley service system comprises a data logging device and wherein the controller stores at least one of a galley feature identification, a label identification, a storage space identification, or fusion data to the data logging device; and stores at least one of an instantaneous state analysis or persistent tracking data.

In various embodiments, the aircraft galley service system comprises a display and the controller outputs a real-time status of the galley area to the display device.

In various embodiments, at least one of the plurality of galley features is a chiller and the controller detects an infrared leakage of the chiller, detects whether the chiller contains a cart, provides an alert to the display to close the chiller in response to the chiller containing a cart, and sets a power supply to the chiller to off in response to the chiller not containing a cart.

Disclosed herein is a method of operating an aircraft galley service system, the method comprising receiving, by a controller, first video data from a first visible light camera observing an aircraft galley area; receiving, by the controller, first infrared data from a first infrared camera observing the aircraft galley area; identifying, by the controller, a plurality of galley features based on at least one of the first video data and the first infrared data; identifying, by the controller, an instantaneous state of the aircraft galley area; and identifying, by the controller, an action in response to the instantaneous state.

In various embodiments, the plurality of galley features comprises at least one of a latch, a label, a bin, an oven, a counter, a cart, or a chiller.

In various embodiments the method of operating an aircraft galley service system further comprises identifying, by the controller, a label of at least one of the plurality of galley features; identifying, by the controller, a storage space of the aircraft galley area; and conducting, by the controller, a fusion of at least two of the galley feature identification, the label identification, and the storage space identification.

In various embodiments the method of operating an aircraft galley service system further comprises conducting, by the controller, a status check of the aircraft galley area in response to a flight condition.

In various embodiments the method of operating an aircraft galley service system further comprises receiving, by the controller, second video data from a second visible light camera observing the aircraft galley area. In various embodiments, the first visible light camera has a first field of view and the second visible light camera has a second field of view. In various embodiments, the first field of view and the second field of view overlap.

In various embodiments the method of operating an aircraft galley service system further comprises identifying, by the controller, a common object detected by the first visible light camera and the second visible light camera; identifying, by the controller, a preferred field of view of the common object; and registering, by the controller, the preferred field of view.

In various embodiments the method of operating an aircraft galley service system further comprises conducting, by the controller, in response to the instantaneous state, temporal filtering of the first video data and the second video data; conducting, by the controller, in response to the instantaneous state, persistent tracking of at least one of the plurality of storage spaces, the plurality of galley features; and outputting, by the controller, a real-time status of the aircraft galley area to a display device.

In various embodiments the method of operating an aircraft galley service system further comprises storing, by the controller, at least one of object detection data, label detection data, bin detection data, or fusion data to a data logging device; and storing, by the controller, at least one of inferred instantaneous state analysis data or persistent tracking data.

In various embodiments the method of operating an aircraft galley service system further comprises detecting, by the controller, an infrared leakage of a chiller; detecting, by the controller, whether the chiller contains a cart; providing, by the controller, an infrared leakage alert to the display to close the chiller in response to the chiller containing a cart; and setting, by the controller, a power supply to the chiller to a power saving mode in response to the chiller not containing a cart.

In various embodiments the method of operating an aircraft galley service system further comprises detecting, by the controller, a conditions-based maintenance need of the aircraft galley area; and providing, by the controller, a maintenance need alert to the display.

In various embodiments the method of operating an aircraft galley service system further comprises predicting, by the controller, a preventative maintenance need of the aircraft galley area; and storing, by the controller, a notification of the preventative maintenance need for a future service opportunity.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
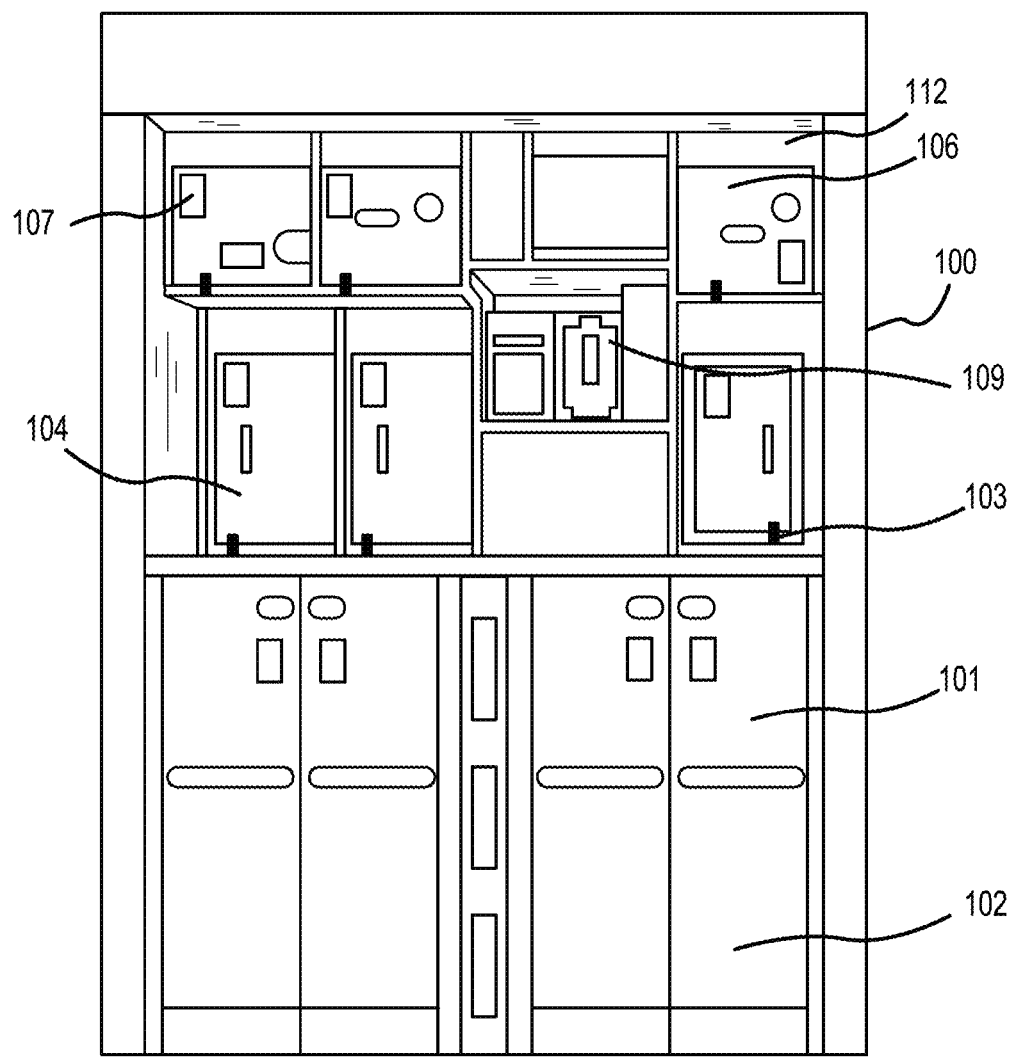
FIG. 1A illustrates an aircraft galley, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Disclosed herein are coordinated and networked systems and methods utilizing various sensor types, networks, interpretive processes and visual capture methods to analyze and infer the galley state and crew activity around the galley. The networked systems and methods may also provide automatic predictive crew service triggers and manage galley functions. Sensors may include visual cameras and infrared cameras. The sensors may detect objects in the galley space and states of the objects such as open/closed or full/empty. The sensors may detect object labels and track the location of objects. The sensors may detect temperature anomalies. The sensors may also detect damage in the galley area. A fusion process may combine or fuse information about the objects and their states based on a probability of detection. An autonomous system may rely on the sensor data and fusion process as inputs to conduct status checks of the galley, track objects and their locations, predict maintenance needs, and control power to appliances and galley features. An autonomous system may rely on the sensor data and fusion process as inputs to detect an occupancy or an in-use status.

Presently, aircraft crew must manually conduct status checks of the galley, track objects and their locations, predict maintenance needs, and control power to appliances and galley features. Automating these processes allows aircraft crew to work more efficiently and focus on other tasks. The disclosed system may provide automatic notification to aircraft crew of anomalies such as open latches, open doors, etc. during flight phases such as takeoff or landing. Further, automating maintenance tracking allows to more efficiently and effectively conduct preventative maintenance and conditions-based maintenance.

With reference to FIG. 1A, an aircraft galley area 100 is illustrated. In various embodiments, the galley area 100 may comprise a plurality of galley features. The galley features may include doors 101, chillers 102, latches 103, ovens 104, counter areas 105, bins 106, labels 107, carts 108, coffee pots 109, or any other object found in aircraft lavatories.

Figure 1B:
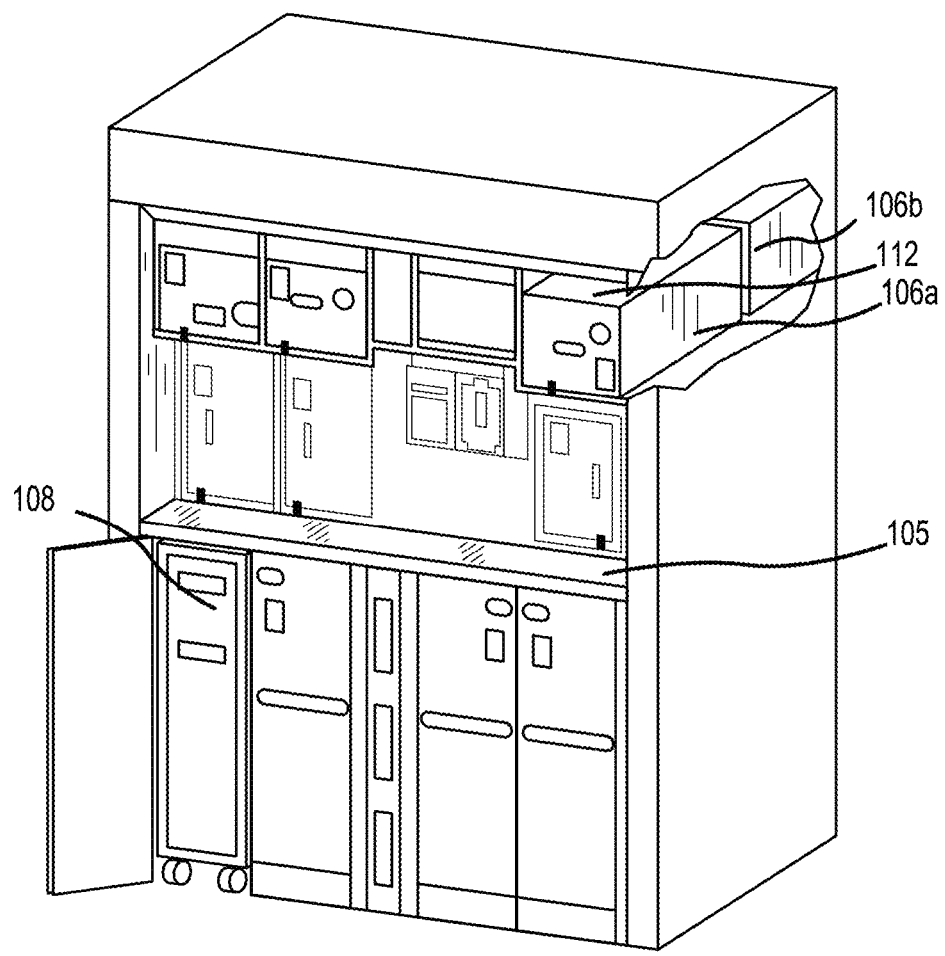
FIG. 1B illustrates an aircraft galley, in accordance with various embodiments.

With reference to FIG. 1B, the galley area 100 may comprise storage areas in which not all objects are visible. For example, bin 106a may be visible while bin 106b is stored behind bin 106a and is not visible. The galley area chillers 102 may store carts 108. The galley area 100 may also comprise a counter 105.

Figure 1C:
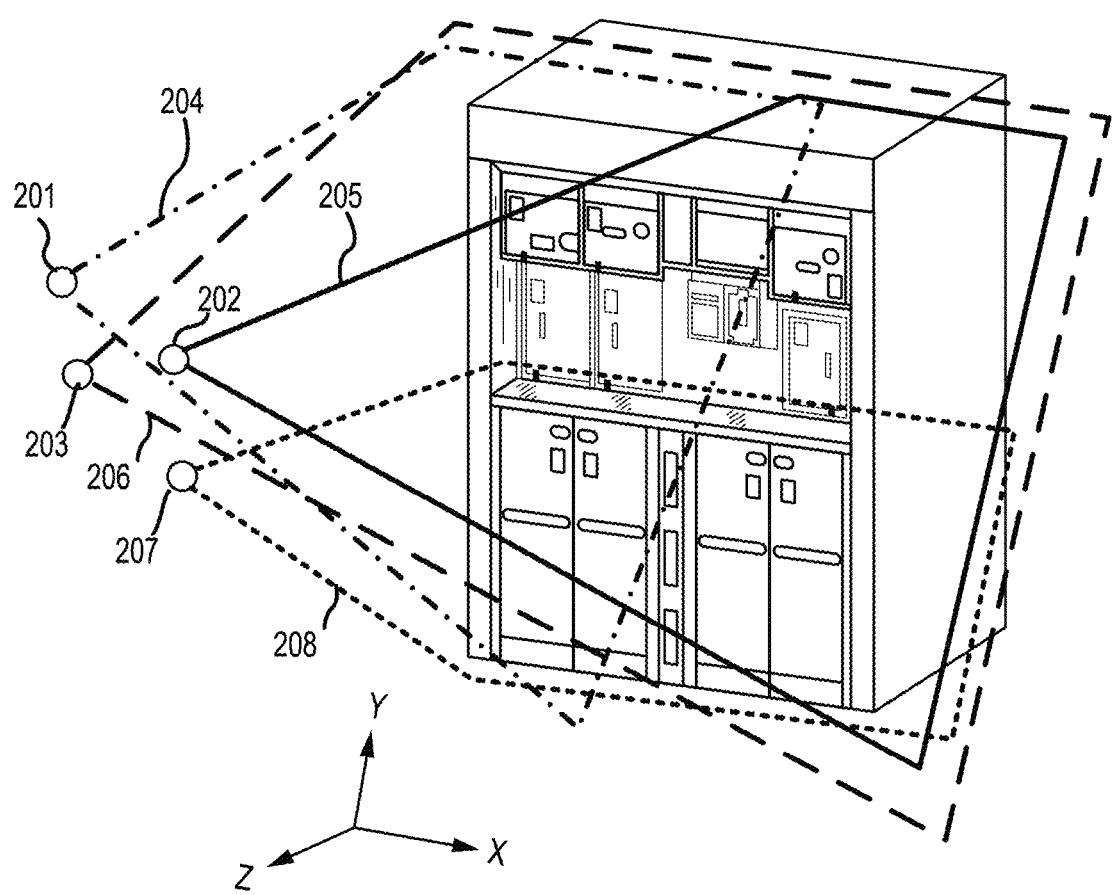
FIG. 1C illustrates an aircraft galley observed by a plurality of sensors, in accordance with various embodiments.
Figure 1D:
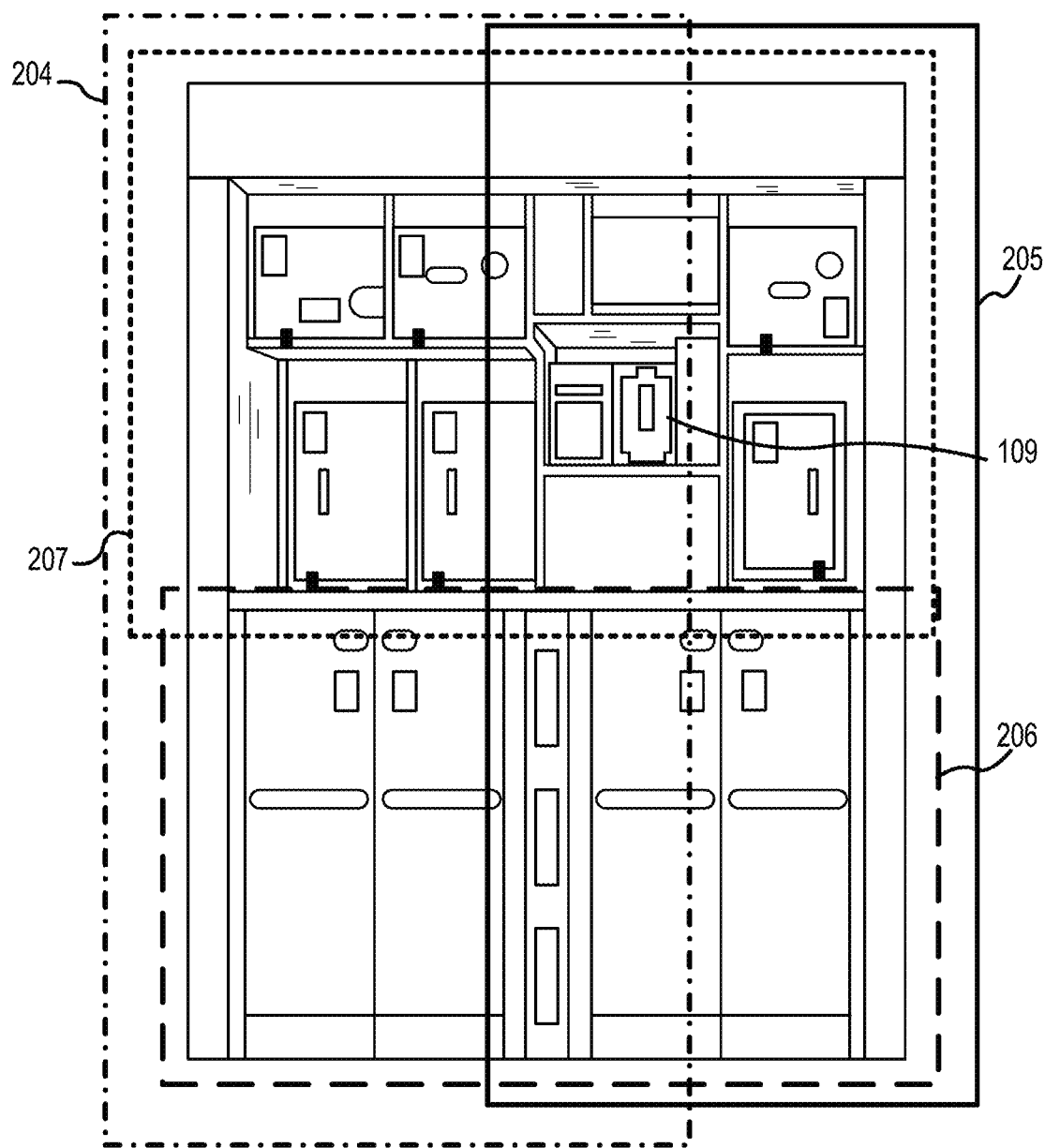
FIG. 1D illustrates an aircraft galley observed by a plurality of sensors, in accordance with various embodiments.

With reference to FIG. 1C, there may be a plurality of sensors such as visible light cameras 201, 202 and infrared cameras 203, 207. Visible light cameras 201, 202 and infrared cameras 203, 207 are depicted as separate cameras. However, there could be one camera with an array of sensors or multiple cameras with arrays of sensors. For example, there could be a single camera with a visible light camera 201 and an infrared camera 203. For example, there could be a single camera with a first visible light camera 201 and a second visible light camera 202. For example, there could be a single camera with a first infrared camera 203 and a second infrared camera 207. For example, there could be a single camera with two visible light cameras 201, 202 and two infrared cameras 203, 207. There may be any number, n, of visible light cameras or infrared cameras. The plurality of sensors are depicted as visible light cameras and infrared cameras; however, it is also contemplated that the plurality of sensors could comprise infrared (IR) dot projectors, IR illuminators, or an IR light source.

The plurality of sensors may be positioned to observe the galley area 100 and galley features. As used herein "visible light cameras" means cameras or other sensors capable of sensing visible light, about 380 nm-700 nm in wavelength. As used herein, "infrared cameras" means cameras or other sensors capable of sensing infrared light, about 760-1,000 nm in wavelength. There may be a plurality of visible light cameras 201, 202 disposed in or near aircraft galley area 100. There may be a first visible light camera 201 and a second visible light camera 202. The first visible light camera 201 may have a first field of view 204. The first field of view 204 may be of a portion of the galley area 100. For example, the first field of view 204 may be of a left half of the galley area 100, the right half of the galley area 100, the top of the galley area 100, the center of the galley area 100, the bottom of the galley area 100, a combination of portions of the galley area 100, or the entire galley area 100. The second visible light camera 202 may have a second field of view 205. The second field of view 205 may be of a portion of the galley area 100. For example, the second field of view 205 may be of a left half of the galley area 100, the right half of the galley area 100, the top of the galley area 100, the center of the galley area 100, the bottom of the galley area 100, a combination of portions of the galley area 100, or the entire galley area 100. The first field of view 204 may overlap with the second field of view 205. As used herein "left" and "right" would be from the perspective of a person or a sensor facing the galley area, or along the x-axis. As used herein "top" and "bottom" would be from the perspective of a person or a sensor facing the galley area, or along the y-axis. As used herein, "center" could be a portion of the gally area encompassing a portion of at least two of the left half, the right half, the top half, or the bottom half of the galley area.

With reference to FIG. 1C, there may be a plurality of infrared cameras 203, 207. The infrared cameras 203 may have a third field of view 206. The third field of view 206 may be of a portion of the galley area 100. For example, the third field of view 206 may be of a left half of the galley area 100, the right half of the galley area 100, the top of the galley area 100, the center of the galley area 100, the bottom of the galley area 100, a combination of portions of the galley area 100, or the entire galley area 100. The third field of view 206 may overlap with the first field of view 204, the second field of view 205, or both. The infrared cameras 207 may have a fourth field of view 208. The fourth field of view 208 may be of a portion of the galley area 100. For example, the fourth field of view 208 may be of a left half of the galley area 100, the right half of the galley area 100, the top of the galley area 100, the center of the galley area 100, the bottom of the galley area 100, a combination of portions of the galley area 100, or the entire galley area 100. The fourth field of view 208 may overlap with the first field of view 204, the second field of view 205, the third field of view 206, or a combination therein.

With reference to FIGS. 1A-1D, the plurality of visible light cameras 201, 202 and the plurality of infrared cameras 203 observe the galley area 100 and the galley features. The plurality of visible light cameras 201, 202 and the plurality of infrared cameras 203 may detect objects, detect labels for each object, detect people, and track movement of objects and people.

Figure 2:
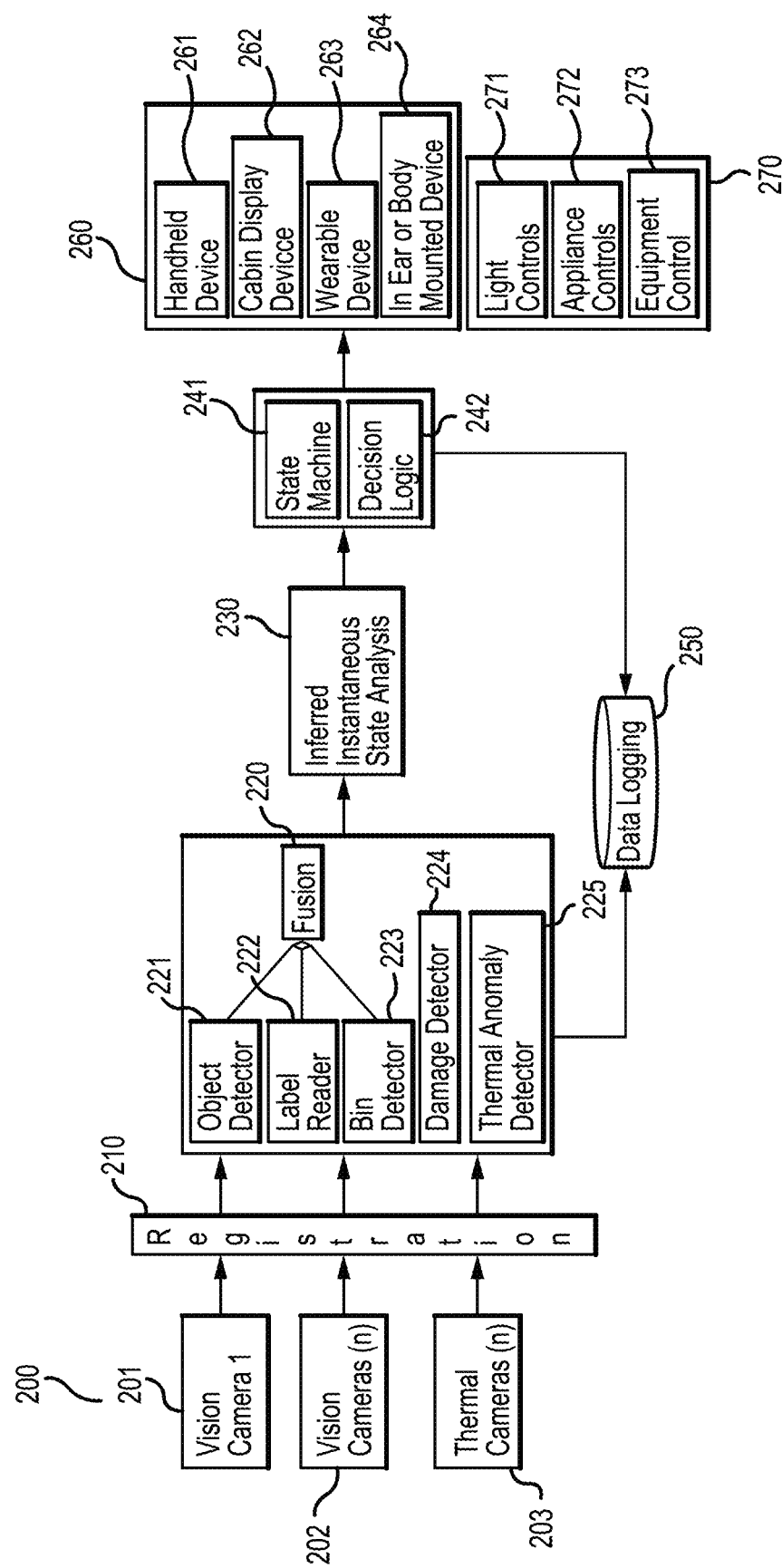
FIG. 2 is a block diagram illustrating a predictive crew galley service system, in accordance with various embodiments.

With reference to FIG. 2, a machine learning system 200 is disclosed. The machine learning system 200 may comprise inputs of the observations from the plurality of visible light cameras 201, 202 and/or the plurality of infrared cameras 203.

In various embodiments, the registration step 210, the machine learning system 200 may decide whether the plurality of visible light cameras 201, 202 and/or the plurality of infrared cameras 203 observed the same object. For example, with respect to FIG. 1D, a first visible light camera 201, with a first field of view 204, and a second visible light camera 202, with a second field of view 205, may both observe a coffee maker 109. If so, the machine learning system 200 may choose whether to use the image data from the first visible light camera 201, image data from the second visible light camera 202, or combine the image data to use the image data from both. For example, the machine learning system 200 in the registration step 210 may decide which camera is best positioned to observe the door 101. The machine learning system 200 may then discard image data from the inferiorly positioned camera and process image data from the best positioned camera. The machine learning system 200 may identify a priority camera for fixed objects based on their location. The machine learning system 200 may choose a secondary camera for fixed objects in response to determining the priority camera has an obstructed view due to a non-fixed object. For example, if a crew member stands in the field of view of the priority camera and obstructs a fixed object from view of the priority camera, the machine learning system 200 may choose the secondary camera to track the fixed object. The machine learning system 200 may identify a priority camera for a non-fixed object based on its proximity to the center of a field of view of one of the plurality of sensors. The machine learning system 200 may identify a priority camera for a non-fixed object based on determining the object is unobstructed in a field of view of one of the plurality of sensors.

In various embodiments, an object detector model 221 may identify galley features. In various embodiments, an object detector model 221 may identify the presence of persons in the galley area 100. In various embodiments, the object detector model 221 may identify objects, persons, or galley features based on their shapes. In various embodiments, the object detector model 221 may identify objects, persons, or galley features based on their infrared signatures.

In various embodiments, a label detector model 222 may detect labels on galley features. Label detector model 222 may also be referred to herein as a label reader or a label reader model. The labels may be readable by the plurality of sensors. For example, the labels could be text, optical bar codes, QR codes, RFID tags. In various embodiments, the label detector model 222 can recognize text. In various embodiments, a bin detector model 223 may identify storage bins 106 or storage spaces 112.

In a fusion step 220, the machine learning system 200 may combine information about the detected objects, the labels, and the storage spaces 112 to determine which objects are in which storage spaces 112. In a fusion step 220, the machine learning system 200 may combine information about the detected objects, the labels, and the storage spaces 112 to determine an order of objects in a storage space 112. For example, and with momentary reference to FIG. 1B, the machine learning system 200 may detect bin 106b enter a storage space 112 first and may detect bin 106a enter the same storage space 112 second. The machine learning system 200 may conclude that bin 106a is located in a front space of the storage space 112 while bin 106b is located in a back space of the storage space 112.

In various embodiments, a damage detector model 224 uses image data from the plurality of visible light cameras 201, 202 and/or the plurality of infrared cameras 203 to detect damage to objects such as scratches, chips, cuts, missing hardware, etc.

In various embodiments, an infrared anomaly detector model 225 monitors infrared activity in the galley area 100. The infrared anomaly detector model 225 may comprise information about infrared thresholds associated with galley features. For example, infrared anomaly detector model 225 may comprise infrared thresholds associated with chillers 102 or ovens 104. Infrared anomaly detector model 225 may detect infrared leakage associated with galley features.

In various embodiments, the machine learning system 200 performs an inferred instantaneous state analysis step 230. The state analysis 230 may be an iterated analysis. The state analysis 230 may be a continuous analysis. In the state analysis step 230, the machine learning system 200 combines the data from at least one of the object detector model 221, the label detector model 222, the bin detector model 223, the damage detector model 224, the infrared anomaly detector model 225, or the fusion step 220. The state analysis 230 may determine the state of each galley feature. For example, the state analysis 230 may determine that a galley feature is open or closed, that a galley feature is present, that a galley feature is in or out of storage, that a galley feature is on the counter, that there is crew personnel present, that there is a spill detected, or that a galley feature is experiencing infrared leakage. The state analysis 230 is input into a state machine model 241 and a decision logic model 242.

In various embodiments, the state machine model 241 conducts temporal filtering of the data from the plurality of visible light cameras, the plurality of infrared cameras, and the inferred instantaneous state analysis. In various embodiments, the state machine model 241 conducts persistent tracking of the galley area 100 and galley feature states. The state machine model 241 tracking may be iterative or may be continuous.

In various embodiments, the decision logic model 242 generates actions and/or requirements. For example, the decision logic model 242 may use multiple data and triggers to make decisions about actions in the galley. The decision logic model 242 may comprise data regarding the flight stage. For example, the decision logic model 242 may be aware of whether the aircraft is preparing for or conducting taxi, takeoff, or landing operations. If the aircraft is preparing for or conducting taxi, takeoff, or landing operations, the decision logic model 242 may determine that system status checks must be completed for the galley area 100. The decision logic model 242 may automate system status checks. System status checks may involve confirming that doors 101 in the galley area 100 are closed, latches 103 in the galley area 100 are secure, loose objects (such as bins 106, coffee makers 109, or trash) are secured, the counter 105 is clear, etc. The decision logic model 242 may perform system status checks and provide alerts to crew if the system status check is incomplete or finds anomalies. The decision logic model 242 may comprise requirements for other stages of flight such as times for food service, limits on movement due to turbulence or seat-belt-fastened requirements, etc. The decision logic model 242 may perform system checks associated with or pertinent to any phase of flight.

In various embodiments, the machine learning system 200 saves data from at least one of the object detector model 221, the label detector model 222, the bin detector model 223, the damage detector model 224, or the infrared anomaly detector model 225. In various embodiments, the machine learning system 200 saves data from at least one of the state machine model 241 or the decision logic model 242. The data may be saved to a data logging device 250. The data logging device may collect and store information useful to prognostics and health maintenance. The data logging device 250 may store data pertinent to mean time between failures of the galley features or end of life of the galley features. For example, the data logging device 250 may store information such as how many times a door 101 was opened. The data logging device 250 may store information relevant to preventative maintenance. For example, the data logging device 250 may store information about whether the door hinges on door 101 should be replaced to prevent damage after the mean time between failure threshold of door openings has been reached. The data logging device 250 may store information relevant to condition based maintenance. For example, the data logging device 250 may store information that hardware is missing on a certain galley feature or that a scratch is on a galley feature. Data logging device 250 may then alert maintenance crews to conditions to address more efficiently and before the condition worsens.

In various embodiments, at least one of the state machine model 241 or the decision logic model 242 provide a status report to at least one of a handheld device 261, a cabin display device 262, a wearable device 263, or a body-mounted device 264 such as in-ear device. The status report provided may include alerts about anomalies.

In various embodiments, the machine learning system 200, in response to data from at least one of the state machine model 241 or the decision logic model 242, performs actions in the galley area 100. The machine learning system 200 may perform galley control functions 270. The galley control functions 270 may comprise light control functions 271 such as turning lights on and off or dimming lights. The galley control functions 270 may comprise appliance control functions 272 such turning appliances on or off, changing the setting of an appliance, or setting timers on appliances. The galley control functions 270 may comprise equipment control functions 272 such as controlling temperature of a galley feature, providing power to a galley feature, setting a galley feature to a power saving mode, or turning power off to a galley feature. The machine learning system 200 may save data to the data logging device 250 regarding status reports, alerts, and actions taken by the machine learning system 200.

Figure 3:
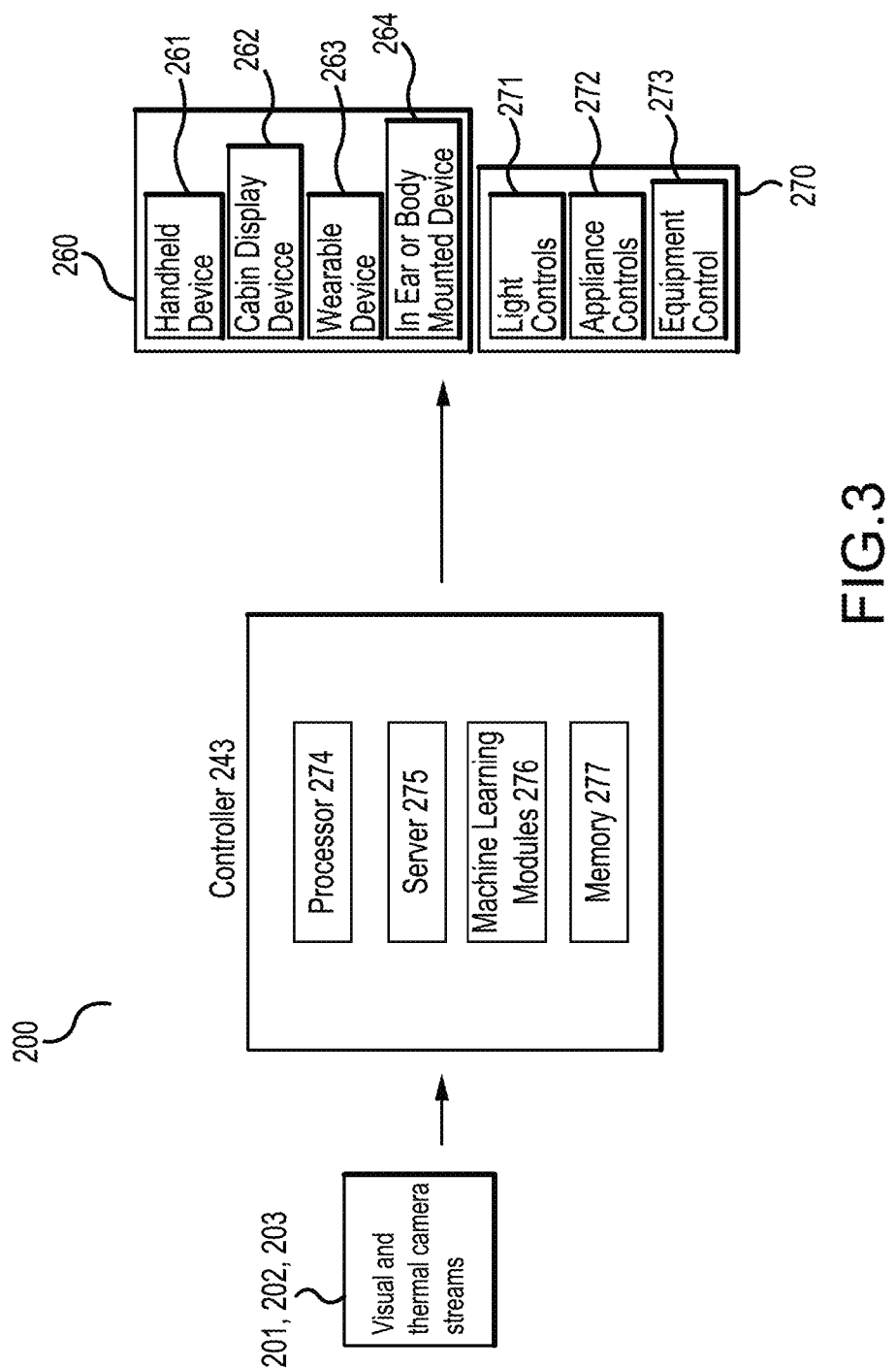
FIG. 3 is a block diagram illustrating a predictive crew galley service system, in accordance with various embodiments.

With reference to FIG. 3 and in various embodiments, the machine learning system 200 may comprise a controller 243. The controller 243 may be a hardware device. The controller may receive data from the plurality of visible light cameras 201, 202 and/or the plurality of infrared cameras 203. The controller 243 may comprise a processor 274, a memory 277, a message server 275, and multiple machine learning models 276. The machine learning models may perform at least one of the registration step 210, the object detector model 221, the label detector model 222, the bin detector model 223, the damage detector model 224, the infrared anomaly detector model 225, the fusion step 220, the inferred state analysis 230, the state machine model 241, or the decision logic model 242. The controller 243 may comprise the data logging device 250. The controller 243 may output commands to perform galley control functions 270.

Processor 274 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA), a Graphics Processing Unit (GPU), a Tensor Processing Unit (TPU), or other programmable logic device, discrete gate or transistor logic, discrete hardware components, or any combination thereof.

Memory 277 stores executable instructions and data to implement control logic of system processor 274. Memory 277 may comprise a tangible, non-transitory storage medium and may store data used, for example, storing machine learning models and decision logic.

Machine learning modules 276 may be a software module that may be executed by processor 274 and stored on memory 277. In various embodiments, machine learning module 276 may comprise one or more modules such as one or more machine learning model modules and a decision making logic module designed for the galley area 100. The one or more machine learning models may be classification models. In various embodiments, the classification models are pretrained prior to use in the galley area 100. In various embodiments, machine learning modules 276 receives the sensor data from another module or hardware component. Machine learning module 276 receives the sensor data from sensors 201, 202, and 203; analyzes the sensor data; and provides an action to perform. Machine learning module 276 may then send a message to message server 275 indicating the action to perform. The message server 276 may be a message queuing telemetry transport server.

Figure 4:
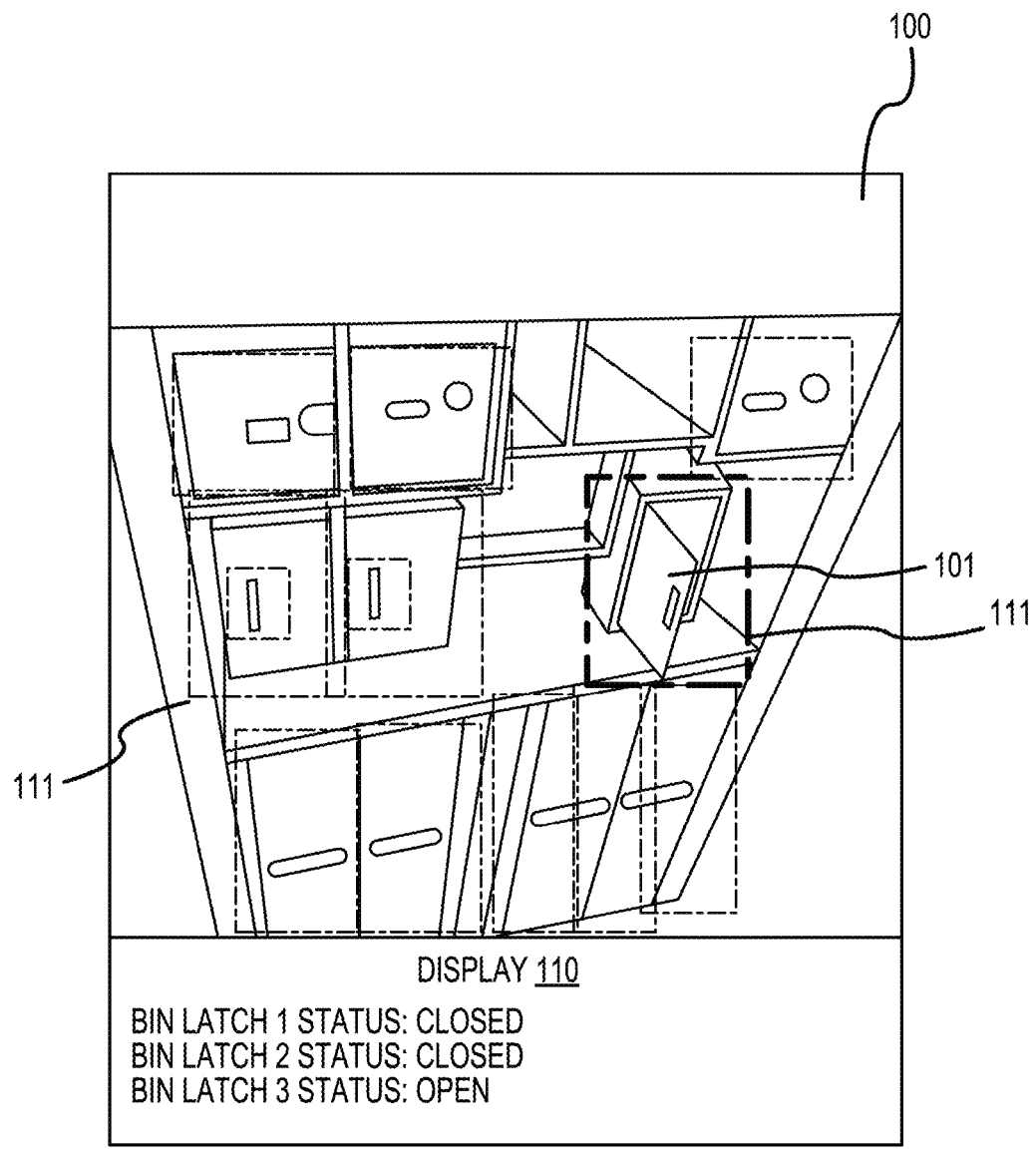
FIG. 4 illustrates visual status identification and display of a predictive crew galley service system, in accordance with various embodiments.

With respect to FIG. 4A, the machine learning system 200 may comprise a display 110. The display 110 may be located on a handheld device 261, a cabin display device 262, a wearable device 263, or a body-mounted device 264. The display 110 may provide a real-time video of the galley area 100. The display 110 may provide a real-time inferred state analysis of the galley area 100. The display 110 may provide a real-time status report of the galley area 100. For example, the display 110 may overlay visual status indicators 111 over identified galley area features. FIG. 4A depicts non-bolded and bolded visual status indicators, but it is contemplated that the visual status indicators could be color-coded. For example, a red visual status indicator 111 may indicate an anomaly such as an open door 101, an open latch 103, a spill on the counter 105, etc. The display 110 may also provide a written status report of each galley feature and each galley feature state.

Figure 5:
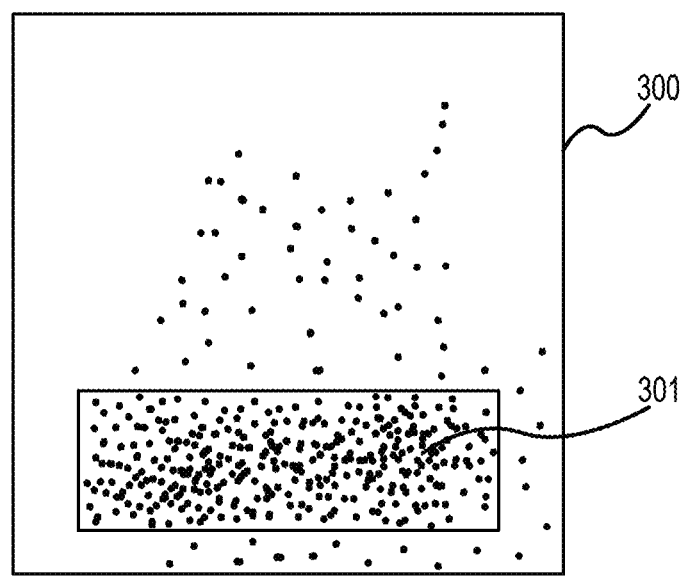
FIG. 5 illustrates infrared identification and display of a predictive crew galley service system, in accordance with various embodiments.

With respect to FIG. 5, the machine learning system 200 may comprise an infrared display 300. The infrared display 300 may comprise a visual indication of infrared anomalies 301. Infrared anomalies 301 may include infrared leakage or the presence of a person in the galley area.

Figure 6:
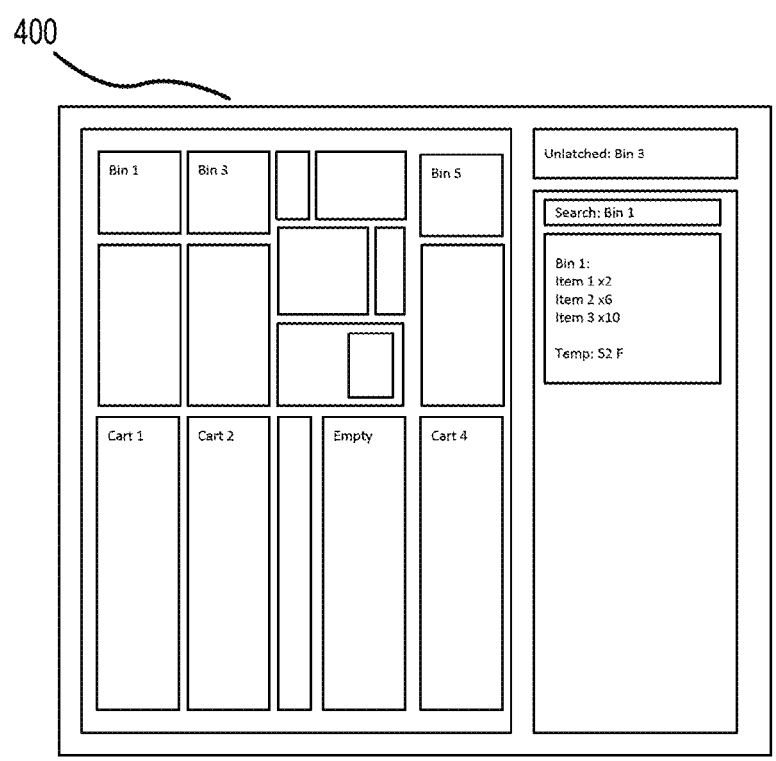
FIG. 6 illustrates a graphic user interface for a predictive crew galley service system, in accordance with various embodiments.

With respect to FIG. 6, the machine learning system 200 may comprise a graphic user interface (GUI) 400. The GUI 400 may be located on a handheld device 261, a cabin display device 262, a wearable device 263, or a body-mounted device 264. The GUI 400 may comprise a search bar used to search for an item, a location, or a condition of the galley area. The GUI 400 may respond to manual requests. The GUI 400 may respond to vocal or audible requests. The graphic user interface 400 may support conducting or monitoring checklists such as galley status checks. The graphic user interface 400 may provide real time information about which objects are located or stored in which galley storage spaces 112.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft galley service system, comprising:
   a galley area comprising a plurality of galley features, wherein at least one of the plurality of galley features is a chiller;
   a first visible light camera;
   a first infrared sensor;
   a display; and
   a controller, wherein the controller is configured to perform:
   receiving, by the controller, first video data from the first visible light camera,
   receiving, by the controller, first infrared data from the first infrared camera,
   identifying, by the controller, at least one galley feature of the plurality of galley features based on at least one of the first video data and the first infrared data,
   identifying, by the controller, an instantaneous state of the galley area,
   conducting, by the controller, in response to the instantaneous state, temporal filtering of the first video data and the second video data,
   conducting, by the controller, in response to the instantaneous state, persistent tracking of at least one of the galley features, wherein the persistent tracking includes:
   detecting, by the controller, an infrared leakage of the chiller,
   detecting, by the controller, whether the chiller contains a cart,
   identifying, by the controller, an action in response to the instantaneous state, wherein the action includes providing, by the controller, an alert to the display to close the chiller in response to the chiller containing a cart, and
   outputting, by the controller, a real-time status of the galley area to the display device.

2. The aircraft galley service system of claim 1, wherein the plurality of galley features comprises at least one of a latch, a bin, an oven, a counter, a cart, or a chiller.

3. The aircraft galley service system of claim 1, wherein the controller is further configured to perform:
   identifying, by the controller, a label of at least one of the plurality of galley features,
   identifying, by the controller, a storage space of the galley area, and
   conducting, by the controller, a fusion of at least two of the galley feature identification, the label identification, and the storage space identification.

4. The aircraft galley service system of claim 1, further comprising a second visible light camera, wherein the first visible light camera has a first field of view and the second visible light camera has a second field of view, and wherein the first field of view and the second field of view overlap.

5. The aircraft galley service system of claim 4, wherein the controller is further configured to perform:
   identifying, by the controller, a common object detected by the first visible light camera and the second visible light camera,
   identifying, by the controller, a preferred field of view of the common object, the preferred field of view being a view best positioned to observe the common object, and registering, by the controller, the preferred field of view.

6. The aircraft galley service system of claim 1, further comprising a data logging device and wherein the controller is further configured to perform:
   storing, by the controller, at least one of a galley feature identification, a label identification, a storage space identification, or fusion data to the data logging device, and
   storing, by the controller, at least one of an instantaneous state analysis or persistent tracking data.

7. A method of operating an aircraft galley service system, comprising:
   receiving, by a controller, first video data from a first visible light camera observing an aircraft galley area;
   receiving, by the controller, first infrared data from a first infrared camera observing the aircraft galley area;
   identifying, by the controller, a plurality of galley features based on at least one of the first video data and the first infrared data;
   identifying, by the controller, an instantaneous state of the aircraft galley area;
   conducting, by the controller, in response to the instantaneous state, temporal filtering of the first video data and the second video data;
   conducting, by the controller, in response to the instantaneous state, persistent tracking of at least one of the plurality of storage spaces, the plurality of galley features; wherein the persistent tracking includes:
   detecting, by the controller, an infrared leakage of a chiller;
   detecting, by the controller, whether the chiller contains a cart;
   providing, by the controller, an infrared leakage alert to the display to close the chiller in response to the chiller containing a cart;
   identifying, by the controller, an action in response to the instantaneous state, wherein the action includes setting, by the controller, a power supply to the chiller to a power saving mode in response to the chiller not containing a cart; and
   outputting, by the controller, a real-time status of the aircraft galley area to a display device.

8. The method of claim 7, wherein the plurality of galley features comprises at least one of a latch, a label, a bin, an oven, a counter, a cart, or a chiller.

9. The method of claim 7, further comprising:
   identifying, by the controller, a label of at least one of the plurality of galley features;
   identifying, by the controller, a storage space of the aircraft galley area; and
   conducting, by the controller, a fusion of at least two of the galley feature identification, the label identification, and the storage space identification.

10. The method of claim 7, further comprising:
    conducting, by the controller, a status check of the aircraft galley area in response to a flight condition.

11. The method of claim 7, further comprising:
    receiving, by the controller, second video data from a second visible light camera observing the aircraft galley area, and wherein the first visible light camera has a first field of view and the second visible light camera has a second field of view, wherein the first field of view and the second field of view overlap.

12. The method of claim 11, further comprising:
identifying, by the controller, a common object detected by the first visible light camera and the second visible light camera;
identifying, by the controller, a preferred field of view of the common object, the preferred field of view being a view best positioned to observe the common object; and
registering, by the controller, the preferred field of view.

13. The method of claim 7, further comprising:
storing, by the controller, at least one of object detection data, label detection data, bin detection data, or fusion data to a data logging device; and
storing, by the controller, at least one of inferred instantaneous state analysis data or persistent tracking data.

14. The method of claim 7, further comprising:
detecting, by the controller, a conditions based maintenance need of the aircraft galley area; and
providing, by the controller, a maintenance need alert to the display.

15. The method of claim 7, further comprising:
predicting, by the controller, a preventative maintenance need of the aircraft galley area; and
storing, by the controller, a notification of the preventative maintenance need for a future service opportunity.

* * * * *